United States Patent
Fuchs et al.

(10) Patent No.: US 6,637,839 B1
(45) Date of Patent: Oct. 28, 2003

(54) METHOD FOR AUTOMATIC BRAKING OF A VEHICLE

(75) Inventors: Alexander Fuchs, Sindelfingen (DE); Wolfgang Kiesewetter, Altdorf (DE); Bernd Knoff, Esslingen (DE); Carsten Lauer, Stuttgart (DE); Lorenz Maack, Boeblingen (DE); Eberhard Pfeifle, Lorch (DE); Manfred Steiner, Winnenden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/069,077

(22) PCT Filed: Jun. 23, 2000

(86) PCT No.: PCT/EP00/05803

§ 371 (c)(1),
(2), (4) Date: Jul. 1, 2002

(87) PCT Pub. No.: WO01/14184

PCT Pub. Date: Mar. 1, 2001

(30) Foreign Application Priority Data

Aug. 21, 1999 (DE) .......................... 199 39 817

(51) Int. Cl.⁷ .................................................. B60T 7/12
(52) U.S. Cl. ..................................................... 303/191
(58) Field of Search ............................ 303/7, 125, 191; 188/353

(56) References Cited

U.S. PATENT DOCUMENTS

| | | | |
|---|---|---|---|
| 5,535,123 A | 7/1996 | Rump et al. | ............ 364/426.02 |
| 5,669,676 A | 9/1997 | Rump et al. | ................. 303/125 |
| 5,720,532 A | 2/1998 | Steiner et al. | ............... 303/125 |
| 5,979,619 A * | 11/1999 | Rump | ......................... 188/353 |
| 6,315,372 B1 * | 11/2001 | Kroger et al. | ............... 303/191 |
| 6,439,675 B1 * | 8/2002 | Zechmann et al. | ......... 303/191 |
| 6,474,753 B1 * | 11/2002 | Rieth et al. | .................. 303/191 |

FOREIGN PATENT DOCUMENTS

| | | |
|---|---|---|
| DE | 44 22 664 A1 | 6/1994 |
| DE | 196 29 229 A1 | 7/1996 |
| DE | 196 41 470 A1 | 10/1996 |
| DE | 197 22 532 A1 | 5/1997 |

* cited by examiner

*Primary Examiner*—Christopher P. Schwartz
(74) *Attorney, Agent, or Firm*—Crowell & Moring LLP

(57) ABSTRACT

In a method for carrying out an automatic braking operation in a vehicle, a stte variable for describing driver's reactions and/or events outside the vehicle is sensed by means of a sensor, compared with a reference value and, when the reference value is exceeded, a higher braking pressure than the braking pressure corresponding to the brake pedal position is generated. In order to increase reliability, the automatic generation of braking pressure is suspended for a specific holding time if the state variable which is sensed by sensor means lies outside an acceptable tolerance range.

14 Claims, 1 Drawing Sheet

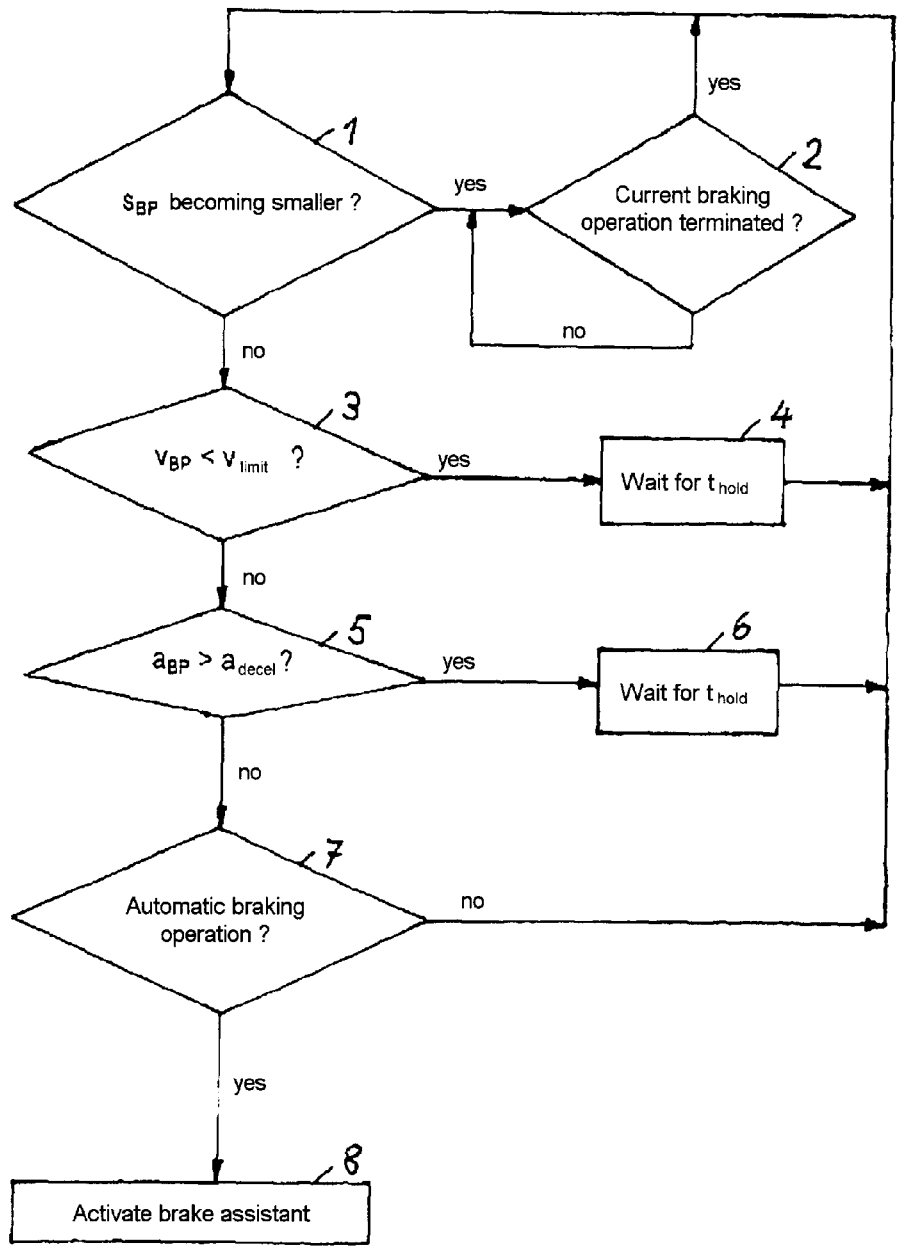

US 6,637,839 B1

METHOD FOR AUTOMATIC BRAKING OF A VEHICLE

BACKGROUND AND SUMMARY OF THE INVENTION

This application claims the priority of PCT International Application No. PCT/EP00/05803 filed Jun. 23, 2000 and German patent document 199 39 817.8, filed Aug. 21, 1999, the disclosure of which is expressly incorporated by reference herein.

The invention relates to a method for automatic braking operation of a vehicle

Automatic brake systems are known which trigger an automatic braking operation with a braking pressure which is greater than the braking pressure corresponding to the brake pedal position, as a function of "panic movement of the driver". Panic movement of the driver is usually detected by means of the speed of the brake pedal, and is assumed to occur if the speed of the pedal exceeds a reference value. In this case, it is assumed that the driver desires a greater braking force than he prescribes at a given time by means of the activation of the brake pedal.

Such systems, which are known under the term "brake assistant" have been described, for example, in German patent documents DE 44 22 664 A1, DE 196 29 229 A1 and DE 196 41 470 A1.

The brake assistant is generally activated until one-of the brake pedal state variables again falls below the reference value, for example as a result of the driver allowing the brake pedal to return in the direction of the home position, completely releasing the brake pedal or at least reducing the brake pedal force. In this case, it is assumed that the driver desires a reduction of the braking force to a value which corresponds to the current brake pedal position.

Because the driver's reactions which trigger an automatic braking operation are sensed by means of sensors, there is a risk that design-related signal falsifications of the sensors or incorrect signals as a consequence of sensor errors may cause the brake assistant to be triggered too early or too late, or even not at all. In particular, when a sensor containing a resistance potentiometer is used to sense brake pedal travel, design-related slider contact resistances may occur which can lead to signal notches at the input of a control device of the vehicle. Such notches can, however, usually be compensated again within a short time so that a correct signal value is present at the control device. However, the signal's rising again after the notch may be interpreted in the control unit as panic braking and lead to triggering of an automatic, but undesired braking operation.

German patent document DE 197 22 532 A1 also discloses a method for suppressing faults at the diaphragm travel sensor of a brake booster. Here, the beginning and the end of the fault are sensed and the measure to be carried out as a result of the fault is selected as a function of the duration of the fault. The state variable sensed at the beginning of the fault is retained and remains constant to the end of the fault. In order to prevent improper triggering of an automatic braking operation at the end of the fault, the unfiltered speed value zero is fed to a speed filter.

One object of the invention is to provide a reliably functioning automatic brake system.

This and other objects and advantages are achieved by the automatic braking system according to the invention, in which if a state variable which is sensed by a sensor lies outside an acceptable tolerance range, triggering of an automatic braking operation is prevented for a specific time period. The reference value which is used as a basis for triggering an automatic braking operation expediently lies outside the tolerance range which needs to be taken into account for the suspension. This provides the advantage that malfunctions of the sensor for sensing the state variable that describes the driver's reaction or the event, can be detected in order to trigger the brake assistant. That is, when a value which is not relevant to the triggering of the brake assistant but which lies in an unusual or marked value range is detected, the triggering of automatic braking is prevented for a specific time period. Within this time period, the automatic braking operation is suppressed even if the state variables which are sensed by sensor fulfil the triggering criteria for generating additional braking force. This ensures that when there is a signal fault which results, in particular, in a drop in the signal value, there is a subsequent dead time or holding time within which the signal can rise again to its correct value without triggering automatic braking. After the dead time has expired, the automatic braking operation can be initiated if the relevant conditions are fulfilled.

In the novel method according to the invention, a significant point in time is identified by reference to a signal value lying outside the acceptable tolerance range. This significant point in time is followed by the holding time within which it is not possible for the automatic braking operation to be triggered.

According to one embodiment, a variable which describes the status of the brake pedal, in particular the brake pedal position, the change in brake pedal position and/or the change in speed of the brake pedal is determined as the state variable to be examined for triggering of automatic braking. If the brake pedal state variables are taken into account, it is possible to implement a graduated strategy for the position, speed and acceleration levels by examining in chronological succession the value range firstly at the position level, then at the speed level and finally at the acceleration level.

At the position level, the sensor value is preferably examined to determine whether the brake pedal position decreases or returns in the direction of its home position. If so, the activation of automatic braking pressure is prevented until the braking operation which is currently under way is terminated. Although, the return of the brake pedal can basically also be determined by means of the speed of the brake pedal., it is advantageous, in particular in very low pedal speed ranges, to detect the change in the pedal position at the position level, because in the low speed range examination of the brake pedal position supplies more precise results than the examination of the speed derived from the pedal position.

The automatic generation of braking pressure can be suspended until the brake pedal position rises again. It is possible both for the brake pedal position to return as far as the unloaded home position and for the position to increase again from a partial braking position.

At the speed level there is expediently an examination to determine whether the speed of the brake pedal drops below an assigned limit value. If a negative value is prescribed as a limit value, automatic generation of braking pressure is advantageously suspended for a predefined or determined constant holding time. The examination at the speed level with the predefinition of a negative limit value makes it possible to detect a signal notch and subsequently to disable the triggering of the automatic generation of braking pressure. As a result, the time period in which the signal value rises strongly again to the correct value after the signal notch is gated out for the triggering of the automatic braking operation.

The speed limit value can be selected in such a way that unambiguous identification of a fault signal is possible; alternatively it is possible to distinguish a real return movement of the brake pedal. However, if the speed limit value lies inside the speed value range to be reached by the brake pedal, disabling of the automatic generation of braking pressure does not lead to any undesired results, because even a real return movement is not expected to trigger the automatic braking operation, at least within the subsequent holding time period which is generally selected to be very short.

In a preferred embodiment of the invention, deceleration of the brake pedal is examined to determine whether it exceeds an assigned deceleration limit value. If the pedal speed decreases within a time period under consideration, by a value that is larger than that which is predefined as acceptable (that is, the deceleration limit value), the sensor value lies outside an acceptable value range and automatic activation of braking pressure is prevented for a given or determined time period.

Other objects, advantages and novel features of the present invention will become apparent from the following detailed description of the invention when considered in conjunction with the accompanying drawings.

BRIEF DESCRIPTION OF THE DRAWINGS

The FIGURE of the drawing shows a flowchart which illustrates the steps of an automatic braking operation, according to the invention.

DETAILED DESCRIPTION OF THE DRAWINGS

The flowchart illustrated in the FIGURE shows a method of determining incorrect sensor values or design-related deviations in sensor values of a vehicle brake system that is activated by a conventional brake pedal, and a system for automatically generating a braking pressure in emergency situations (brake assistant) which exceeds the braking pressure that corresponds to the brake pedal position. By means of the sensors of the brake system it is possible to sense driver's reactions (in particular the position and speed of the brake pedal) and/or external events outside the vehicle, and to use them as a basis for deciding whether to activate the brake assistant. The latter is usually activated only in situations in which a higher braking force is required than the braking force which corresponds to the current brake pedal position brought about by a driver. As a criterion for triggering the brake assistant, it is possible to take into account the speed of the brake pedal. In addition, it is also possible to consider the reduction in the position of the accelerator pedal, the speed with which the driver's foot is removed from the accelerator pedal to the drive pedal, or else events lying outside the vehicle such as the distance to and relative speed of other vehicles. It is possible to integrate the flowchart shown into a system for controlling the distance from other vehicles and the speed.

According to the flowchart, in a method step 1 it is first determined whether the brake pedal position $s_{BP}$ decreases relative to a previously measured position. If so, the process advances to step 2 in accordance with the Yes branch. Otherwise, the cycle proceeds to method step 3 in accordance with the No branch.

If appropriate, it may be expedient also to take into account, in method step 1 or 2, the position of a brake light switch and the position of a trigger switch which deactivates the automatic brake assistant as soon as the brake pedal experiences a trigger travel in the direction of the home position from an activation position. In particular, by means of the position of the trigger switch it is possible to detect whether a braking operation triggered by the driver is taking place. In this case, the interrogation according to method step 1, as to whether the brake pedal position $s_{BP}$ assumes a smaller value in comparison with the proceeding cycle, and the brake pedal is therefore triggered, is started in cyclical repetitions. By taking into account the position of the trigger switch and/or if appropriate, the brake light switch it is possible to detect the beginning and end of a braking operation which is currently taking place.

If the brake pedal position $s_{BP}$ is becoming smaller in method step 1 during a current braking operation, the system branches to method step 2, which implements a holding function restricted to the time period of the current braking operation. In step 2, it is iteratively determined whether the current braking operation has been terminated after which the system returns to step 1, (Yes branch), and the method sequence starts again.

If it is determined in step 1 that the brake pedal position has not returned in the direction of the home position, but is rather following a monotonically increasing course (each value is the same as or larger than in the preceding cycle), either the brake pedal is unactivated, ($s_{BP}=0$) or the vehicle is in the middle of a braking operation with unchanged or increasing brake pedal position. In either case, the brake assistant can basically be activated at any time, provided that there are no other reasons for preventing the activation, and the process advances to step 3 where it is determined whether the brake pedal speed $v_{BP}$ drops below a limit value $v_{limit}$. If so, in step 4, activation of the brake assistant is suspended for the time period $t_{hold}$, after which the system returns to step 1 and the process is repeated with renewed checking to determine whether there are background reasons for activating the brake assistant being started.

The purpose of determining whether brake pedal speed $v_{BP}$ drops below the predefined limiting speed $v_{limit}$ is to detect whether there is a signal notch in the level of a sensor signal representing the pedal speed $v_{BP}$. Such a signal notch can be caused either by a real return movement of the brake pedal or by design-related behavior of the sensor (for example by a suddenly occurring contact resistance at the resistance potentiometer of a diaphragm travel sensor measuring the brake pedal position). In both cases, if the signal notch has been so large that the speed drops below the limiting speed $v_{limit}$, in method step 4 the system waits, in accordance with the Yes branching operation of step 3, for the holding time $t_{hold}$ before further actions are carried out. In particular in the case of a signal notch resulting from a sensor problem, this prevents the ensuing rapid rise in the signal from causing an incorrect triggering of the brake assistant. After expiration of the holding time $t_{hold}$, which is usually set to an order of magnitude of approximately 120 msec, the rising of the signal again has already been concluded in the case of a sensor-related signal notch.

The limiting speed $v_{limit}$ of the method step 3 makes it is possible to distinguish between an actual, positive brake pedal speed, which properly leads to triggering of the brake assistant, and a sensor-related incorrect signal. The brake assistant is usually triggered if the actual brake pedal speed $v_{BP}$ exceeds a positive reference value (the brake pedal position therefore increases with at least the speed corresponding to the reference value). On the other hand, the limiting speed $v_{limit}$ used in step 3 has a negative value to make it clear that the speed of return of the pedal is measured and evaluated, and differs to this extent from the positive reference speed. Different, non-overlapping ranges are defined for the limiting speed and the reference speed.

If it is detected in method step 3 that the sensor value of the pedal speed $v_{BP}$ does not drop below the assigned limiting speed limit, the system proceeds to step 5 in which acceleration is evaluated. That is, in step 5, it is determined whether a signal which represents brake pedal deceleration $a_{BP}$ exceeds a predefined deceleration limit value $a_{decel}$. This check is intended to permit sensor-related signal notches, which last for a short time and are due to a fault, to be detected. It may be necessary to check the acceleration or deceleration in order to sense small, brief faults which are nevertheless capable of triggering the brake assistant. Such faults cannot be detected with the necessary reliability by sensing position or speed, due to the brief duration and low amplitude, If it is detected in method step 5 that the signal value of the brake pedal deceleration $a_{BP}$ exceeds the assigned limit value $a_{decel}$, a signal fault may be present. Thus, the system proceeds to step 6 in which the system waits for a holding time $t_{hold}$ (which is predefined or calculated as a function of current variables) before returning to step 1. As a result, during the holding time $t_{hold}$ activation of a braking assistant is blocked.

The deceleration criterion is met during almost every braking operation as soon as the pedal speed decreases towards the end of the activation of the brake pedal. In this phase, it is, however, in any case usually not expected that the brake assistant will be activated so that the temporary blocking of the brake assistant according to the branching from method step 5 to method step 6 remains without negative effects.

If the brake pedal deceleration $a_{BP}$ does not exceed the assigned limit value $a_{decel}$, the system proceeds to step 7 in which the criteria for the activation of the brake assistant are interrogated. Criteria taken into account can be both state variables within the vehicle (for example the positive speed of the brake pedal,) and state variables outside the vehicle. (such as distance from and speed relative to vehicles travelling ahead). If the corresponding criteria are fulfilled, the brake assistant is activated in step 8 and automatic braking is carried out, with a higher braking pressure than the braking pressure corresponding to the brake pedal position. Otherwise, the system returns to step 1 and the process is repeated.

It may, if appropriate, be expedient to run through the represented method during an automatic braking operation which has already been activated and to interrupt the generation of braking pressure if one of the state variables examined lies outside the acceptable tolerance range.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for performing automatic braking in a vehicle, comprising:

a sensor sensing a state variable which characterizes one of a driver's reactions and events external to the vehicle;

comparing a sensed value of the state variable with a reference value;

generating a higher braking pressure than a braking pressure corresponding to the brake pedal position when the reference value is exceeded; and preventing generation of said higher braking pressure for a specific holding time in response to a departure of the state variable from an acceptable tolerance range.

2. The method according to claim 1, wherein a variable which describes a state of a vehicle brake pedal is taken into account as a state variable.

3. The method according to claim 2, wherein change in brake pedal position is taken into account as a state variable.

4. The method according to claim 3, wherein the automatic generation of braking pressure is prevented if the change in the brake pedal position drops below an assigned limit value.

5. The method according to claim 2, wherein change in speed of the brake pedal is taken into account as a state variable.

6. The method according to claim 5, wherein the automatic generation of braking pressure is prevented if the change in speed of the brake pedal exceeds an assigned limit value.

7. The method according to claim 2, wherein automatic generation of braking pressure is prevented for the duration of an ongoing braking operation if the brake pedal position returns in the direction of the home position.

8. The method according to claim 1, wherein a the holding time is limited to a constant time period.

9. The method according to claim 8, wherein automatic braking operation is resumed after the holding time expires.

10. The method according to claim 1, wherein activation of the automatic generation of braking pressure is permitted only after a trigger switch for sensing activation of the brake pedal has been switched to a passive state.

11. The method according to claim 1, wherein activation of the automatic generation of braking pressure is permitted only after a brake light switch in the vehicle has been switched to a passive state.

12. A method for controlling operation of a vehicle automatic braking system in which automatic braking is activated as a function of a state variable that is indicative of one of a driver's operation of vehicle controls and events external to the vehicle, said method comprising:

detecting when said state variable assumes a value which is outside a permissible tolerance range; and disabling activation of automatic braking for a predetermined time period following a detection of said state variable assuming said value outside said tolerance range.

13. The method according to claim 12, wherein said state variable characterizes operator actuation of a vehicle brake pedal.

14. The method according to claim 13, wherein said state variable comprises at least one of brake pedal position, brake pedal velocity and brake pedal acceleration.

* * * * *